US006490180B2

(12) United States Patent
Hiltunen et al.

(10) Patent No.: US 6,490,180 B2
(45) Date of Patent: Dec. 3, 2002

(54) ARRANGEMENT FOR TRANSFERRING A CONTROL SIGNAL IN A TRANSFORMER

(75) Inventors: Reino Juhani Hiltunen, Lieto (FI); Raimo Kalevi Santahuhta, Lieto (FI)

(73) Assignee: Nokia Multimedia Terminals Oy, Turku (FI)

( * ) Notice: Subject to any disclaimer, the term of this patent is extended or adjusted under 35 U.S.C. 154(b) by 0 days.

(21) Appl. No.: 09/799,476

(22) Filed: Mar. 5, 2001

(65) Prior Publication Data

US 2001/0026463 A1 Oct. 4, 2001

(30) Foreign Application Priority Data

Mar. 6, 2000 (FI) .............................................. 2000504

(51) Int. Cl.[7] .............................................. H02M 3/335
(52) U.S. Cl. .................................................... 363/21.16
(58) Field of Search .......................... 363/21.16, 21.09, 363/21.12, 21.15

(56) References Cited

U.S. PATENT DOCUMENTS 3,694,726 A * 9/1972 Cielo et al. ................... 363/25
4,961,128 A * 10/1990 Bloom ........................ 363/16
5,461,555 A * 10/1995 Kitajima et al. ......... 363/21.16

FOREIGN PATENT DOCUMENTS

DE 19649403 A1 6/1998

* cited by examiner

*Primary Examiner*—Shawn Riley
(74) *Attorney, Agent, or Firm*—Perman & Green, LLP

(57) ABSTRACT

An arrangement for transferring information between the secondary and primary circuit of a transformer wherein control information is transferred to the primary circuit of a power transformer by means of auxiliary windings in the same transformer. The auxiliary windings are arranged in pairs in the transformer core branches in such a manner that the magnetic fluxes ($\Phi_c$) do not induce a voltage in the energy-transferring windings (pw1, pw2), and the voltages induced in the auxiliary windings by the magnetic flux ($\Phi_p$) corresponding to the energy transfer are opposite both in the primary-side winding pair (cw1*a*, cw1*b*) and in the secondary-side winding pair (cw2*a*, cw2*b*). Thus the transfer of a control signal and the transfer of energy will not disturb one another. The transformer may be implemented as a planar structure on a printed circuit board.

5 Claims, 3 Drawing Sheets

ARRANGEMENT FOR TRANSFERRING A CONTROL SIGNAL IN A TRANSFORMER

The invention relates to an arrangement for transferring information between the secondary and the primary circuit of a transformer. The arrangement finds particular utility in transferring control information needed in voltage stabilization across a transformer used in a switched-mode supply.

Switched-mode circuit solutions for providing supply voltage to electronic circuits are very popular because of their relatively good efficiency. A switched-mode circuit always needs an inductive component, usually a transformer, to store energy in a magnetic field and to transfer it further to the load. The primary winding of the transformer is connected to the feeding source of energy and the secondary winding to the load. The energy supplied to the transformer by the primary winding must be controlled according to the load. This requires that the voltage of the load be monitored and a signal dependent of said voltage be transferred to the primary side of the transformer to control the current in the primary winding. In order to minimize the occurrence of malfunctions and to improve electrical safety, galvanic isolation is provided between the secondary and the primary circuits of the feedback.

Figure 1:
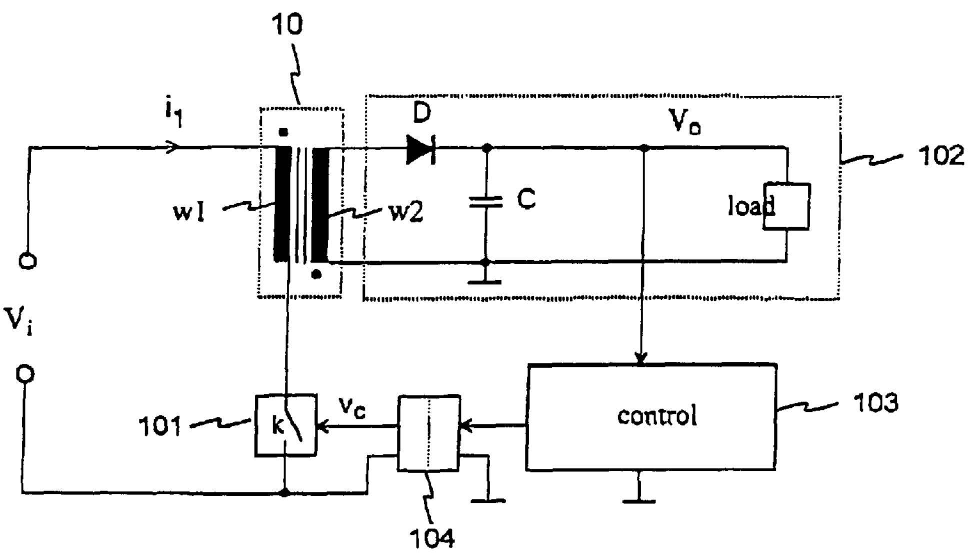
Fig. 1 PRIOR ART

Arrangements are known from the prior art that include a separate component or unit for the galvanic isolation mentioned above. One such known structure is depicted in FIG. 1. It comprises a power transformer 10, switch unit 101, secondary circuit 102, control unit 103 and an isolating unit 104. The transformer 10 comprises a primary winding w1, secondary winding w2 and a ferromagnetic core depicted in FIG. 1 by vertical lines drawn between the windings. The primary winding w1 belongs to a circuit that further includes said switch k and a source of energy which has a certain source voltage $V_i$. The switch k is used to "chop" the current $i_l$ in the primary winding. When the switch is closed, energy is stored in the magnetic field of the transformer. When the switch is open, energy is discharged from the magnetic field of the transformer to the secondary circuit 102. In the simplified structure of FIG. 1 the secondary circuit comprises a rectifier diode D followed by a filter capacitor C and a load connected to the terminals of said filter capacitor. Load voltage $V_o$ is sensed by the control unit 103 the output of which is connected to the input of the isolating unit 104. The output signal $v_c$ of the isolating unit is directed to the switch unit 101 controlled by it. The feedback is arranged such that the load voltage $V_o$ follows relatively faithfully a reference voltage generated at the control unit.

The input and output sides of the isolating unit 104 are galvanically isolated from each other. The method of isolation is not specified in FIG. 1. The isolation may be realized optically, for example, in which case the isolating unit comprises light emitting and receiving components, among other things. The drawback of this solution is that the feedback is relatively slow, which may result in stability problems in voltage regulation. Inductive isolation is also known, in which case the isolating unit comprises a transformer for that purpose. The drawback of this solution is that a separate isolating transformer results in a considerable increase in production costs.

An object of the invention is to reduce said disadvantages associated with the prior art. A structure according to the invention is characterized by what is specified in the independent claim 1. Some advantageous embodiments of the invention are specified in the other claims.

The basic idea of the invention is as follows: Control information is transferred to the primary circuit of a power transformer by means of auxiliary windings in the same transformer. The auxiliary windings are arranged in pairs in the transformer core branches in such a manner that the magnetic fluxes corresponding to the control signal will not induce a voltage in the energy-transferring windings, and the voltages induced by the magnetic flux corresponding to the energy transfer are opposite both in the primary and secondary-side winding pairs. Thus the transfer of control signal and the transfer of energy will not disturb each other. The transformer may be advantageously realized as a planar structure on a printed circuit board.

An advantage of the invention is that it facilitates an arrangement of the transfer of control information to the primary circuit of a power transformer at relatively low production costs. This is made possible by the fact that the necessary auxiliary windings have a small number of turns and can be arranged without an additional stage in the production process. Another advantage of the invention is that it facilitates fast feedback for a switched-mode structure, for example. A further advantage of the invention is that the arrangement according to it is functionally reliable.

Figure 3:
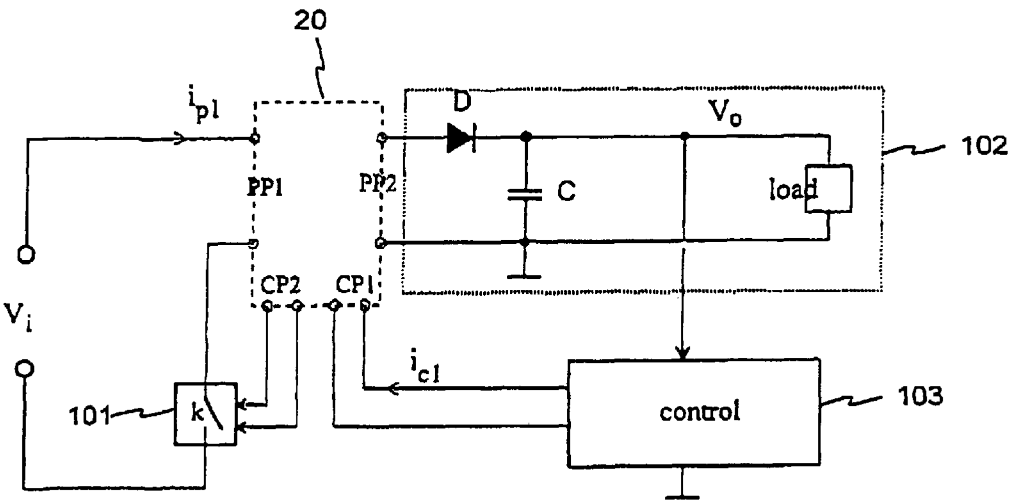
Figure 4:
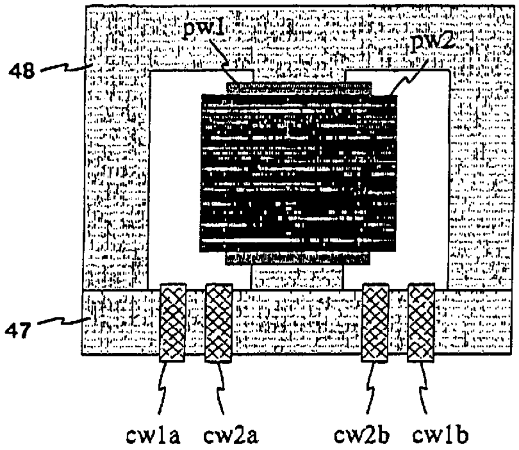
Figure 5:
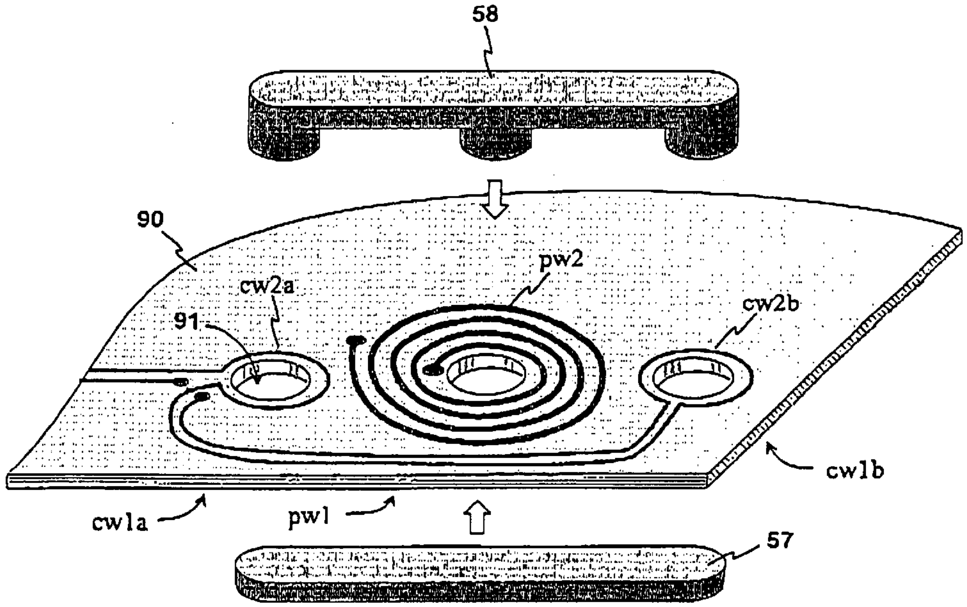
Figure 6:
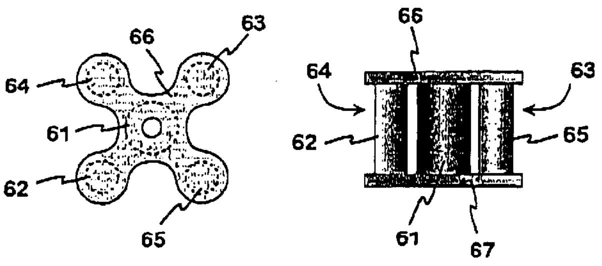

The invention is described in detail in the following. The description refers to the accompanying drawings, in which FIG. 1 shows a prior-art arrangement in a switched-mode voltage source, FIGS. 2*a,b* illustrate the functional principle of the arrangement according to the invention, FIG. 3 shows an example of the arrangement according to the invention in a switched-mode voltage source, FIG. 4 shows an example of a practical arrangement according to the invention, FIG. 5 shows another example of a practical arrangement according to the invention, and FIG. 6 shows an example of a transformer core through which two control signals may be transferred.

FIG. 1 was already discussed in conjunction with the description of the prior art.

Figure 2A:
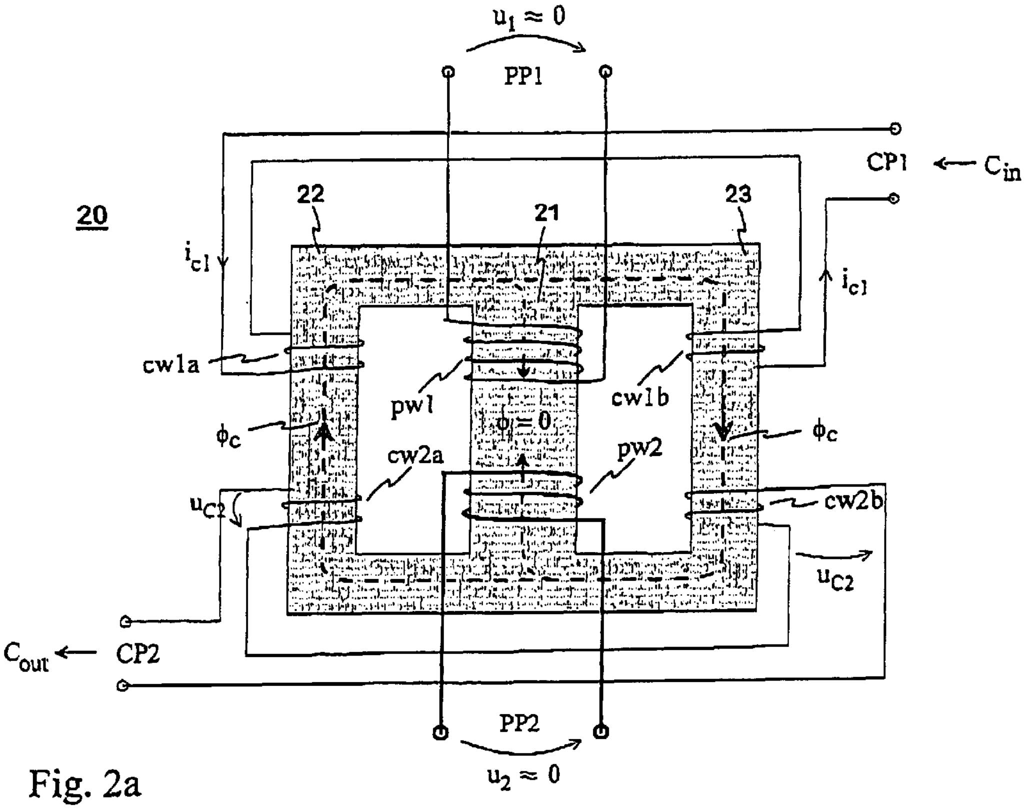

FIGS. 2*a* and *b* show a transformer constructed in accordance with the invention. The core of the transformer has three branches. In the exemplary structure depicted in the figure the first branch 21 is in the middle and has a cross-sectional area larger than the other branches. Around the first branch there is a primary power winding pw1 the terminals of which constitute port PP1, and a secondary power winding pw2 the terminals of which constitute port PP2. The second branch 22 is shown to be to the left of the first branch. Around the second branch there is a first primary control winding cw1*a* and a first secondary control winding cw2*a*. The third branch 23 is shown to be to the right of the first branch. Around the third branch there is a second primary control winding cw1*b* and a second secondary control winding cw2*b*. The first primary control winding cw1*a* and second primary control winding cw1*b* are identical and connected in series. The terminals of the series connection constitute port CP1. Likewise, the first secondary control winding cw2*a* and second secondary control winding cw2*b* are identical and connected in series. The terminals of this series connection constitute port CP2.

For illustrative purposes, the operation of the structure described above is explained with reference to two figures. FIG. 2*a* shows a situation in which a control signal $C_{in}$ is supplied to port CP1 while nothing is supplied to the other ports. Current $i_{c1}$ corresponding to signal $C_{in}$ flows through the first and second primary control windings, generating a magnetic flux in the core of the transformer. The flux generated in the first primary control winding cw1*a* is divided from the second branch 22 of the transformer core into the first and third branches. The flux generated in the second primary control winding cw1*b* is divided from the third branch 23 of the transformer core into the first and second branches. Said windings are connected in series in such way that their fluxes are codirectional in the second and third branches of the core. A flux $\phi_c$ of a certain magnitude is generated in them. On the other hand, the first and second secondary control windings around the second and third branches are connected in series in such way that the voltages $u_{c2}$ induced in them by the flux $\phi_c$ are codirectional as observed from the terminals of the series connection. Port CP2 thus gives a signal $C_{out}$ that follows the variation of the control signal $C_{in}$. The magnetic flux portions of the first and second primary control windings directed to the first branch 21 of the core are opposite. Thus, no voltages are induced in the primary power winding and secondary power winding, i.e. both the voltage $u_1$ of port PP1 and voltage $u_2$ of port PP2 are zero. This means that the energy of the control signal can be transferred from port CP1 to port CP2 without it being lost in ports PP2 and PP2. Neither will the transfer of the control signal disturb the feeding of energy to the load.

Figure 2B:
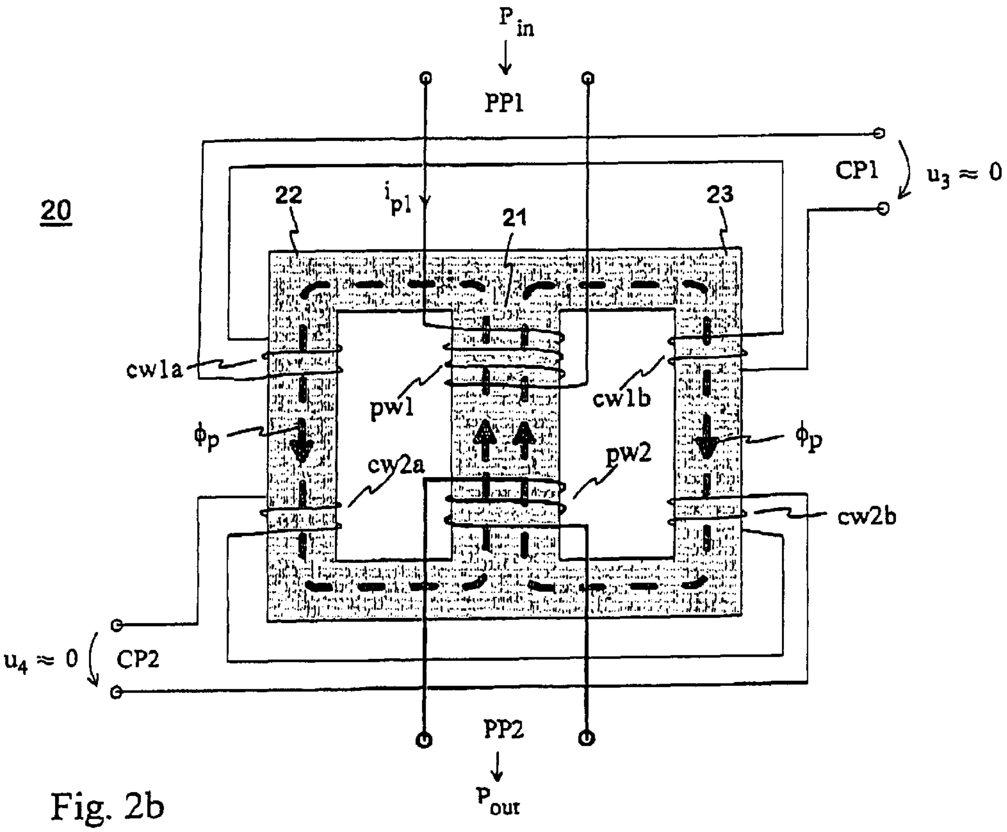

FIG. 2*b* shows a situation in which energy is supplied to port PP1 at power $P_{in}$ while nothing is supplied to the other ports. Current $i_{p1}$ flowing through the primary power winding pw1 causes in the transformer core a magnetic flux which is equally divided from the first branch 21 to the second and third branches. There is in both loops a flux $\phi_p$ of a certain magnitude. The variation of the flux $2\phi_p$ of the first branch induces in the secondary power winding pw2 a voltage which is used in generating the load voltage. Energy is transferred to the secondary circuit at power $P_{out}$. Now the fluxes in the second and third branches of the transformer core do not form a flux circling the outer perimeter of the core, like in the case of FIG. 2*a*, but go parallel, as observed in the direction of the branches. Therefore, the voltages induced in the first and second primary control windings are opposite, as observed from the terminals of the series connection of the windings in question. Voltage $u_3$ of port CP1 is thus zero. Likewise, the voltages induced in the first and second secondary control windings are opposite, as observed from the terminals of the series connection of the windings in question, whereby voltage $u_4$ of port CP2 is zero, too. This means that the transfer of energy through the transformer to the load will not disturb the transfer of control information between control ports CP1 and CP2.

FIG. 3 shows a structure corresponding to the switched-mode structure of FIG. 1. It comprises a switch unit 101, secondary circuit 102, and a control unit 103 just as in FIG. 1. What is different is that the control signal for the switch unit is now transferred through the power transformer in accordance with the invention. The structure and designators of the power transformer 20 correspond to FIGS. 2*a* and *b*. An external source of energy, which has a certain source voltage $V_i$, is connected to the primary power port PP1. The secondary power port PP2 is connected to the secondary circuit 102. The output signal of the control unit 103 is connected to the primary control port CP1, and the secondary control port CP2 is connected to the switch unit 101. A separate isolating unit, such as block 104 in FIG. 1, is not needed in this case.

FIG. 4 shows a second example of the implementation of a transformer according to the invention. In that implementation the core of the transformer comprises an E-shaped part 48 and an I-shaped part 47. The primary power winding pw1 and secondary power winding pw2 are around the middle projection of the E part. The first primary control winding cw1*a* and first secondary control winding cw2*a* are around the left end of the I part of the core. In the terms used in the description of FIGS. 2*a,b*, said left end of the I part belongs to the second branch of the transformer core. The second primary control winding cw1*b* and second secondary control winding cw2*b* are around the right end of the I part of the core. In the terms used in the description of FIGS. 2*a,b*, said right end of the I part belongs to the third branch of the transformer core. All windings are made before the E and I parts of the core are attached to each other. Thus the increase caused by the control windings in the manufacturing costs of the transformer is relatively small.

FIG. 5 shows a third example of the implementation of a transformer according to the invention. In this example the transformer is realized on a printed circuit board. The circuit board 90 of FIG. 5 has three holes, such as 91, for taking the branches of the transformer core through the board. The windings of the transformer are conductive strips around said holes on the surface of the circuit board. In the example of FIG. 5 there is on the upper surface of the circuit board 90 a spiral secondary power winding pw2 around the middle hole. In addition, there is on the upper surface, around the left hole 91, a single-turn first secondary control winding cw2*a* and around the right hole a single-turn second secondary control winding cw2*b*. These control windings are connected in series according to the invention such that they are opposite in direction. Invisibly on the lower surface of the circuit board there are in the corresponding fashion a primary power winding pw1, a first primary control winding cw1*a* and a second primary control winding cw1*b*.

In the example of FIG. 5 the transformer core consists of an E-shaped part 58 and an I-shaped part 57. For clarity, these are drawn pulled out from their mounting position. The E-shaped part has dimensions such that its three projections match the holes in the circuit board 90. The I-shaped part 57 is attached from the opposite side of the circuit board to the projections of the E-shaped part so that in this case, too, two loops are produced that are magnetically well conductive. The projections of the E-shaped part are short, so the whole transformer structure is relatively flat.

The printed circuit board onto which the transformer is assembled may naturally be a multilayer board as well. Windings of the transformer may then be advantageously positioned in the various intermediate layers.

Above it was described some solutions according to the invention. The invention is not limited to those solutions only. The shape of the transformer core may vary greatly. It also may include more than three branches. One such core is the X core, depicted in FIG. 6 from above and from the side. The X core comprises a center pole and, symmetrically, two pairs of other poles. In addition, it includes an upper plate 66 and lower plate 67 that close the magnetic circuits. Power windings are placed on the center pole 61. Windings for the transfer of one control signal can be positioned in the pole pair 62, 63. In the other pole pair 64, 65 it is then possible to place the windings needed for the transfer of another control signal. When the windings are wired in accordance with the invention, the energy needed by the load and two separate control signals can be transferred through the transformer without any one of them disturbing the other two.

Furthermore, the invention does not limit the materials used in the transformer, nor its manufacturing method. The inventional idea may be applied in numerous ways within the scope defined by the independent claim.

What is claimed is:

1. An arrangement for transferring a control signal between the secondary and primary circuit of a transformer, which transformer comprises a core having at least a first, second and a third branch, and having around the first branch a primary power winding and secondary power winding, wherein the arrangement further comprises:

connected in series, a first primary control winding around said second branch and a second primary control winding around said third branch for conveying the energy of a control signal into the core of said transformer, and connected in series a first secondary control winding around said second branch and a second secondary control winding around said third branch for extracting the energy of a control signal from said core.

2. An arrangement according to claim 1, wherein:

said second and third branches are symmetrical with respect to said first branch, said first and second primary control windings are identical with each other, and said first and second secondary control windings are identical with each other.

3. An arrangement according to claim 1, in which the core of said transformer comprises an E-shaped part and an I-shaped part attached to each other, whereby said second branch consists of a first outermost projection of the E-shaped part and a first end of the I-shaped part of the transformer core, and said third branch consists of a second outermost projection of the E-shaped part and a second of the I-shaped part of the transformer core, wherein said first primary control winding and first second control winding are around the first end of the I-shaped part of the transformer core, and said second primary control winding and second secondary control winding are around the second end of the I-shaped part of the transformer case.

4. An arrangement according to claim 1, which further comprises a printed circuit board, and wherein said transformer core branches are taken through holes in said printed circuit board and at least one of said windings is a conductive strip on a surface of a layer of said printed circuit board.

5. An arrangement according to claim 1, in which said transformer core further comprises a fourth branch and a fifth branch, and wherein the fourth and fifth branches are symmetrical with respect to said first branch and there are around them four windings in the same manner as the first and second primary control winding around the second branch, and the first and second secondary control winding around the third branch in order to transfer a second control signal through and transformer.

* * * * *